United States Patent [19]

Luebbert

[11] Patent Number: 5,537,628

[45] Date of Patent: Jul. 16, 1996

[54] METHOD FOR HANDLING DIFFERENT CODE PAGES IN TEXT

[75] Inventor: David L. Luebbert, Bellevue, Wash.

[73] Assignee: Microsoft Corporation, Redmond, Wash.

[21] Appl. No.: 298,217

[22] Filed: Aug. 29, 1994

[51] Int. Cl.⁶ .................................................. G06F 3/14
[52] U.S. Cl. .......................................... 395/144; 395/148
[58] Field of Search ..................................... 395/144, 145, 395/146, 148

[56] References Cited

U.S. PATENT DOCUMENTS

| | | | |
|---|---|---|---|
| 4,587,631 | 5/1986 | Nielsen et al. | 364/900 |
| 5,075,851 | 12/1991 | Kugimiya et al. | 395/144 X |
| 5,167,016 | 11/1992 | Bagley et al. | 395/144 |
| 5,197,122 | 3/1993 | Miyoshi et al. | 395/144 X |
| 5,244,039 | 6/1993 | Cox et al. | 395/144 X |
| 5,251,293 | 10/1993 | Ishii et al. | 395/144 X |
| 5,319,748 | 6/1994 | Motoyama | 395/144 |
| 5,321,801 | 6/1994 | Ando | 395/144 X |
| 5,347,625 | 9/1994 | Kajimoto et al. | 395/144 X |
| 5,359,708 | 10/1994 | Bloomer et al. | 395/148 |
| 5,412,566 | 5/1995 | Sawa | 395/148 X |
| 5,438,657 | 8/1995 | Nakatani | 395/148 |

OTHER PUBLICATIONS

Tony Webster & Associates (Wordperfect 5.1 for Windows), 1992, pp. 139–141.

*Primary Examiner*—Mark K. Zimmerman
*Assistant Examiner*—Cliff N. Vo
*Attorney, Agent, or Firm*—Ronald M. Anderson

[57] ABSTRACT

A method and word processing system for handling text pasted into a document that uses a foreign character set or code page. The code page used by text pasted into a document is preserved when that is displayed and edited. The word processing system keeps track of the appropriate code page for each run of text in the document using a piece table and a data block for the file(s) in which each piece of text is stored. Each document that is created has a piece table that includes an array of character positions and a corresponding array of data records. Each piece referenced in the array of character positions includes adjacent characters of text that are stored in a common file. When a file is opened to paste text into the document, the word processing system creates a file control block for that file, which includes a default code page identifier. The array of data records for each piece includes a pointer to the file control block. For any run of text that uses a code page different than the default for the file, an exception block is created. By referencing the default code page and any exception block, the word processing system determines the appropriate code page to be applied when text is displayed and edited. Foreign code page characters are translated into the native code page characters in the display buffer, but references to the foreign code pages are preserved when the document is stored, so that the characters encoded using the foreign code page are not lost or changed in the document.

29 Claims, 5 Drawing Sheets

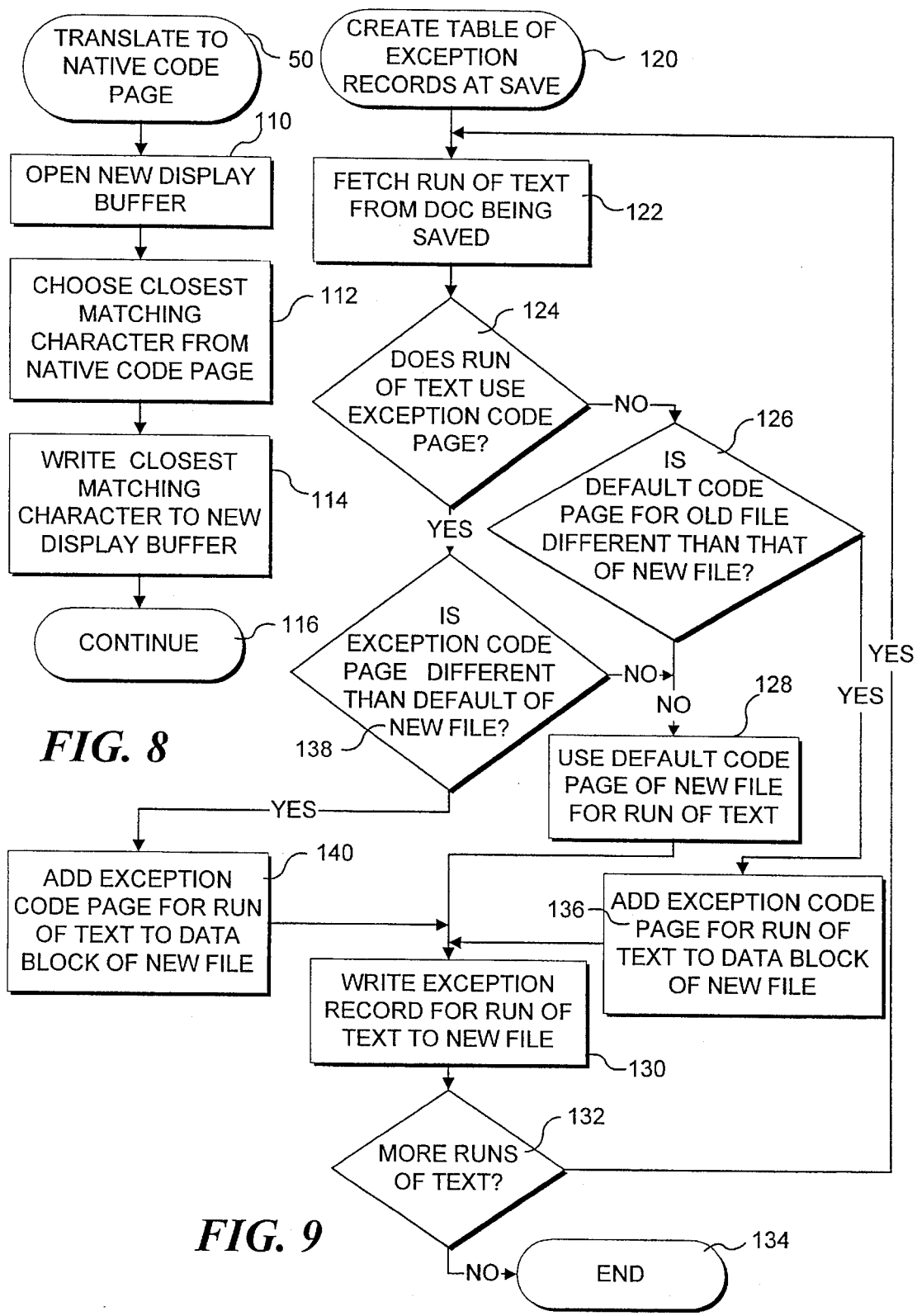

METHOD FOR HANDLING DIFFERENT CODE PAGES IN TEXT

FIELD OF THE INVENTION

The present invention generally relates to a method for handling text imported into a word processing system from a different system, and more specifically, to a method for handling code pages for imported text that are different than a native code page used by the word processing system and to a word processing system that employs that method.

BACKGROUND OF THE INVENTION

In a word processing document, each letter of the alphabet (or each symbol of an ideograph system, such as Japanese Kanji) is mapped to a different numeric value when stored in a file. The specific one-to-one mapping relationship employed is referred to as a code page. The Roman alphabet and common symbols associated with it comprise less than 200 different characters. Each of these characters can be represented by a single byte (integers ranging from 0 through 255). Although there are accepted standards that address the mapping between these integer numbers and the characters, these standards are not universally followed. For example, over 100 symbols are assigned to different numbers in the two code pages respectively used by MICROSOFT™ WINDOWS™ operating system and by the SYSTEM 7™ operating system used by APPLE™ MACINTOSH™ computers.

When pasting text into a document, it is relatively simple to translate text encoded using the code page of another (foreign) system to that of the native word processing system, so that the imported text can be displayed and edited. However, some of the symbols in the foreign code page may not have a corresponding symbol in the native code page. Between the WINDOWS™ and MACINTOSH™ operating systems, there are about 15 characters that have no code page equivalent.

If text containing any character for which there is no corresponding code page equivalent is pasted into a document by a word processing system, such characters will either not be displayed or will be replaced by an unintelligible character. If the document's text is encoded using the native code page and saved, characters that do not have an equivalent representation in the native code page will be lost or changed. Subsequently, if the document that includes the imported text is exported back to the operating system on which the imported text was created, the document will not include the characters that were not properly translated. Conventional word processing systems do not employ any method for handling imported text that will ensure the foreign code page representation of characters is correctly retained. As a result, the prior art is unable to properly move text with different code pages back and forth between word processing systems running on different types of computers.

SUMMARY OF THE INVENTION

In accordance with the present invention, a method is defined for handling text that is encoded using a code page different than a native code page. The method includes the steps of producing a piece table that includes an array of character positions and an array of data records. The array of character positions is divided into a plurality of pieces. Each data record corresponds to a piece of the array of character positions. Based upon data in the array of data records, files in which the text referenced by the plurality of pieces is stored are identified. Data blocks that record a default code page for the text are written to each native format file. If any text stored in a file is encoded using a code page different than the default code page recorded for the file, exception data are written to the data block in the file that identify an exception code page for encoding the text. If the code page used for encoding any text to be displayed differs from the native code page, the text is displayed by translating between the code page used for encoding the text and the native code page. The code page for encoding the text to be displayed remains unchanged in the file in which that text is stored and in the file in which the document is saved. Thus, any characters in the text that do not use the native code page are retained unchanged.

The method further includes the steps of providing a file control block (FCB) for each file that is opened to access the text stored within the file. The FCB includes an indication of a default code page for encoding the text stored within the file.

In addition, the method includes the step of determining the code page for encoding any character in the text comprising a document by identifying the piece that references the character. Based upon the record in the array of data records that corresponds to the piece, a file number and a file position for the character are determined. The indication of the default code page is determined by referring to the FCB of the file.

Another step of the method is directed to providing an exception data block in the file. The exception data block includes an exception code page identifier for any run of text stored within the file that is not encoded using the default code page.

Yet another step of the method is determining whether an exception code page identifier should be recorded in the file to which the document is saved. The exception code page identifier is recorded for a specific run of text if the run of text uses a code page that differs from the default code page for the file in which the document is saved. The data block includes an array of file disk pages used for tracking any exception code page used in the file.

The step of translating includes the step of mapping any characters in the text that are encoded using a code page different than the native code page to a display buffer. The step of mapping then comprises the step of applying a best possible match of characters using the native code page to those characters using the different code page.

A further aspect of the present invention is a word processing system for handling text imported into a document, wherein the imported text is encoded using a foreign code page that is different than a native code page of the word processing system. The word processing system includes a computer having a memory in which predefined instructions are loaded that cause the computer to implement its word processing functions, a display screen, and a user interface that enables a user to enter text into a document. In addition, the word processing system includes elements implemented in software that carry out functions generally consistent with the steps of the method discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 8 is a flow chart showing the logical steps that occur in the present invention when a character using a foreign code page is translated to the native code page for display; and FIG. 9 is a flow chart showing the logic involved in saving text using different code pages so that the code page references are preserved.

DESCRIPTION OF THE PREFERRED EMBODIMENT

Overview of Word Processing System

Figure 1:
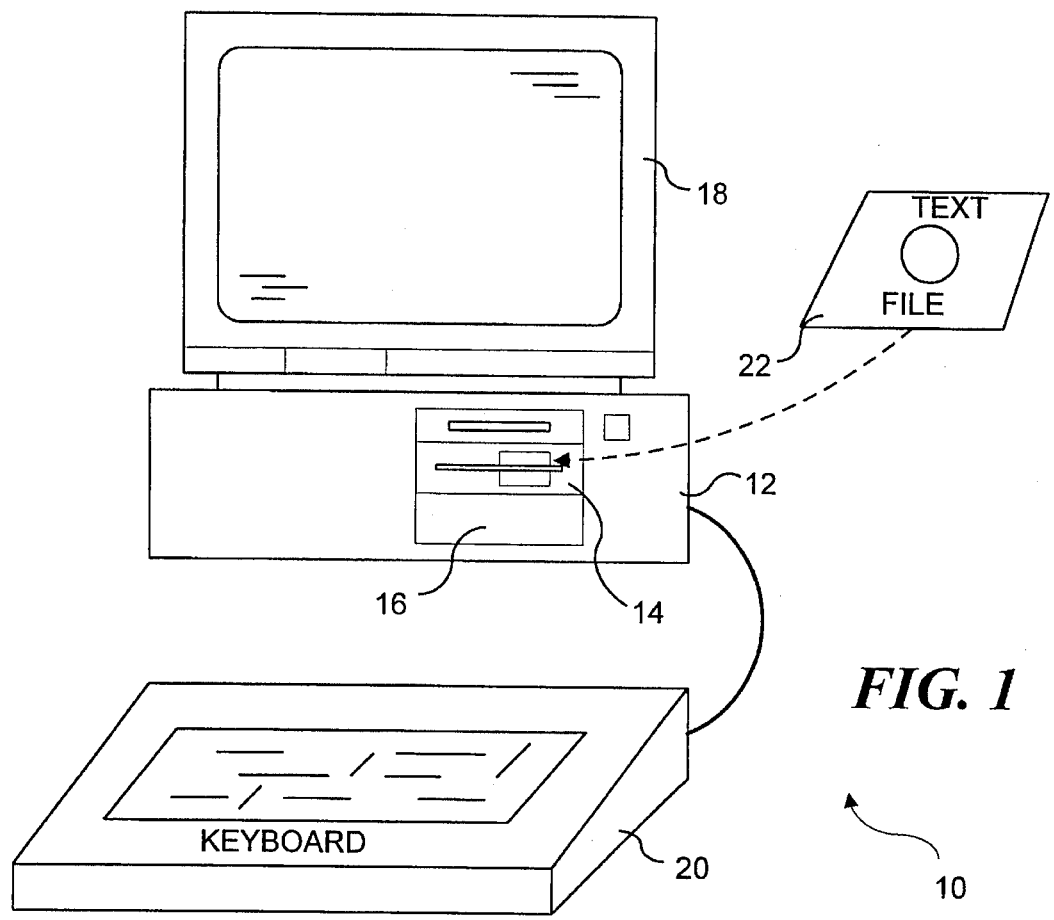
FIG. 1 is a block diagram of a conventional personal computer used for executing word processing software that handles text using different code pages in accordance with the present invention.

The present invention is embodied in a word processing system that is intended to be run on a generally conventional desktop or portable computer, or at a workstation on a local area network. For purposes of this disclosure, the preferred embodiment of the invention is discussed in regard to a desktop computer 10, which is shown generally in FIG. 1. Desktop computer 10 includes a processing unit 12 in which is disposed a mother board that includes a central processing unit (CPU), random access memory (RAM), read only memory (ROM), and other integrated circuits and circuit boards appropriate to support the operation of the desktop computer. While none of these internal components of processing unit 12 are separately shown in the Figure, the internal configuration of a personal computer or other computer system suitable for running the word processing system that implements the present invention is well understood by those of ordinary skill in the art.

Preferably, the word processing system in accordance with the present invention operates under a graphic user environment, such as MICROSOFT™ WINDOWS™, which currently runs on desktop or portable computers that use an INTEL™ type 80386, 80486, or PENTIUM™ microprocessor. Alternatively, the word processing system embodying the present invention can also be executed on other types of computers, such as APPLE™ MACINTOSH™ computers. In the preferred embodiment discussed below, the word processing system software is MICROSOFT™ Word for Windows, Version 6, hereafter referred to simply as "WinWord 6."

Personal computer 10 is generally conventional and includes a floppy disk drive 14 and a hard drive 16 for non-volatile program and data storage. The word processing program and support files are stored on hard drive 16 and are loaded into RAM for execution on personal computer 10 when the program is selected by the user. A display 18 is provided for displaying documents while WinWord 6 is running under the graphic user environment, enabling the user to input and edit text in the documents on a keyboard 20, which is attached to the processing unit. Text can be imported into a document in the word processing system using, for example, a floppy disk 22, which may have been created on a different type of computing system that uses a different character set or code page than computer system 10. As noted above in the Background of the Invention, documents created under the MACINTOSH™ operating system are based upon a character set or code page that is different than the character set or code page used under the WINDOWS™ operating system. Accordingly, the present invention provides a method and a word processing system for handling such foreign code pages in connection with text encoded with the foreign code page that is pasted into a document, which is open on computer system 10. In this discussion, it is important to distinguish between "document" and "file." For purposes of this disclosure and the claims that follow, a document is simply a sequence of characters that is being created or changed using the word processing system and may include text drawn from one or more files.

Figure 2:
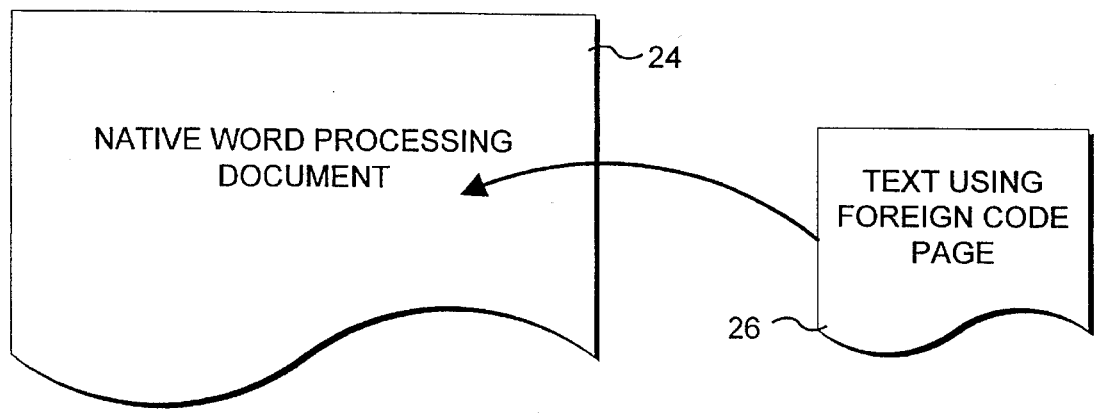
FIG. 2 is a schematic block diagram illustrating how text using a foreign code page is inserted into a document that uses a code page native to the word processing system.

As indicated in FIG. 2, a user may choose to paste text that was created using a foreign code page 26 into a native word processing document 24 that was opened under and originally created using the word processing system running on computer system 10. Instead of initially converting all of the text encoded with the foreign code into another file before allowing the user to display and/or edit the text, the present invention only translates the characters of that text, which are displayed. Thus, the present invention saves considerable time compared to conventional word processing systems that first convert all characters from a foreign code page to the native code page used by the operating system on which a document is open, before allowing any display or editing of the text.

Method for Handling Different Code Pages

One of the key aspects of the present method and of the word processing system in which it is implemented is a data structure that allows code executing within the word processing system to readily identify the code page that is used for text within a file. The data structure used by WinWord 6 that enables this recognition is referred to as a "piece table." The piece table allows the word processing system to keep track of all additions and changes made to a document by a user, so that when the document is full saved to a file, all of the parts that are out of sequence as a result of editing can be fitted together in a contiguous sequence. As explained below, the piece table also enables tracking of the code page used by characters of the text comprising the document.

In the piece table, each character of a document is assigned a numerical coordinate, ranging from the first character at a coordinate zero to the nth character, which is assigned coordinate n−1. A piece table therefore includes a monotonically increasing sequence of character position coordinates, without duplicates, which are stored in a variable length character position array. The first character in the character position array is 0, the coordinate of the first character of the text that appears at the beginning of a document, and the last coordinate position in the character position array contains the coordinate n that references the limit of the last character in a document that contains n characters. This character position array thus partitions the document into a sequence of pieces. Each piece represents a string of one or more characters that are adjacent to each other in the document and are stored in a common file.

Although it would be hard to conceive of such a document, in the worst possible case, each character in a document could be stored in a different file than its adjacent or neighboring characters, so that a total of n+1 pieces would be required to reference all of the n characters in the document. It should be apparent that the piece table for most documents will have much fewer pieces than this extreme case.

The piece table also includes an array of data records, which are kept in one-to-one correspondence with the entries recorded in the array of character positions. Each of these entries is referred to as a piece descriptor (PCD). The PCDs or entries in the array of data records include a file number identifying a particular file and a file position within that file where the characters in a piece can be found. If any word processing document that is stored in a file on hard drive 16 is opened by the word processing system, it will have a piece table or one will be created for it. As text is pasted from one open file into the active document by the word processing system, one or more pieces corresponding to the pasted text will be copied into the piece table for the active document being created/edited with the word processing system from the piece table that is the source for the imported text. Each PCD corresponding to one of the pieces in the array of data records of the piece table of the active document will record the file number for the file and a file position within the file where the corresponding piece can be found. Similarly, if another file is opened in order to paste text into the native word processing document, a second file identifier will be introduced within the entries stored in the array of data records. The second identifier will identify the second file in which one or more pieces of text pasted into the native document is stored.

The PCD for each piece pasted into the native document from a different file also indicates the file position within the different file at which the piece of text can be found. For example, if two adjacent elements in the array of character positions for the native document are found at character coordinate positions 100 and 101 in the document, and the corresponding PCD for the element at character coordinate 100 points to file 2, location 1010, the character in the document at character coordinate position 100 can be found at location 1010 in file 2, and the character at character coordinate position 101 can be found at location 1011 in file 2. Similarly, any character position coordinate in the piece table can be found by referencing the corresponding PCD in the array of data records to determine the file number and file coordinates for that character position.

The piece table data structure is important, because it enables the word processing system to keep track of the file from which each character of text in the document open on the word processing system was derived and the file position within each such file. With this information and by reference to data concerning characteristics of runs of text that are stored with the file, the code page used by each character of text pasted into the document is readily determined. Very little overhead is required for storing and tracking such information.

Each time that a file is opened by the word processing system, information concerning the file is stored in a record referred to as a file control block (FCB). Although other data are stored in the FCB, for purposes of the present invention, it is important to note that WinWord 6 stores a two-byte short word field in the FCB that is a code page/character set identifier, called the chs. The different values that can be recorded in this two-byte portion of the FCB, referred to as the fcb.chs, encode the code page that is to be used as a default to interpret text stored in the file referenced by the FCB, unless that text is tagged to specify that another code page should be used. WinWord 6 also uses this two-byte identifier to indicate the language use in a document, so it is possible to use only a single byte to indicate the code page used.

When a file for a typical word processing document is saved, the default code page chs that is used for the file is stored in the header block for the file. Subsequently, when the file is opened, the chs that is recorded in the header block is copied into the fcb.chs.

Text can also be pasted into a document from files not created on a word processing system, such as in the form of ASCII text produced under the MS-DOS or UNIX™ operating systems. Any time that a file does not store a header indicating the default code page that should be used for the text in the file, the specification (i.e., a two-byte word) indicating the default code page that will be used for the text in the file is set to that of the native word processing system, which is WinWord 6 in the preferred embodiment.

Tracking Exception Data for Text in a File

If any text recorded within a file is to be interpreted using a different code page than the code page identified by the file header information, exception records are recorded for character ranges stored within the file. These exception records identify the code page that should be used to interpret the text for those character ranges.

Code page exception identifiers are recorded using a two level lookup table that allows a word processing program to page into memory only a small part of the potentially voluminous exception information recorded for a file. The lowest level of this lookup table comprises an array of data structures called file disk pages (FKPs) that are recorded within a binary file produced when the word processing system stores a document. Each FKP entry in the array describes the exception information that has been recorded for a specific contiguous range of characters in the file. The FKP entries are recorded in an ascending sequence, relative to the beginning file position of the range of characters described by each entry. The totality of the FKP entries record all of the exception information for text in the file and totally partition the range of file positions that are used within the file to record text. An FKP entry includes an array of file positions, an array of pointers to the first byte of each exception record, in one-tone correspondence with the array of file positions, and the exception records that are referenced by the array of pointers. The array of file positions identify contiguous ranges of characters within the file, where each contiguous range is described by a common exception record. Even if a contiguous range of characters is characterized by having a default parameter, a "null" entry would exist for the range in the exception records. The entries in the array of file positions form a monotonically increasing sequence of file positions, with no duplicates allowed. Adjacent entries in this table completely partition a specified range of file positions within the file.

Given a file position within the file, it is possible to fetch the exception record that describes the character stored at that position by paging into memory the unique FKP that describes the range of characters that include that file position. By searching within the FKP to identify the entry that encompasses that file position in the file position array, the corresponding pointer to the exception record that describes that file position is accessed, and thus, the proper exception record for that character is determined.

The top level of the lookup table is called a "bin table" and it records the array of file positions that are the beginning file position of each FKP entry stored in the file. An array of unique page identifiers that can be transformed into the location within the file at which the FKP for a range of file positions is located is in one-to-one correspondence with those file positions. This top level of the lookup table is recorded within the word processing file and loaded into memory when the file is opened. It is much smaller than the array of FKP entries and can be easily searched to determine the FKP entry that should be paged into memory in order to retrieve the exception record for a specific file position within a file.

The Steps of the Method for Handling Different Code Pages

Figure 3A:
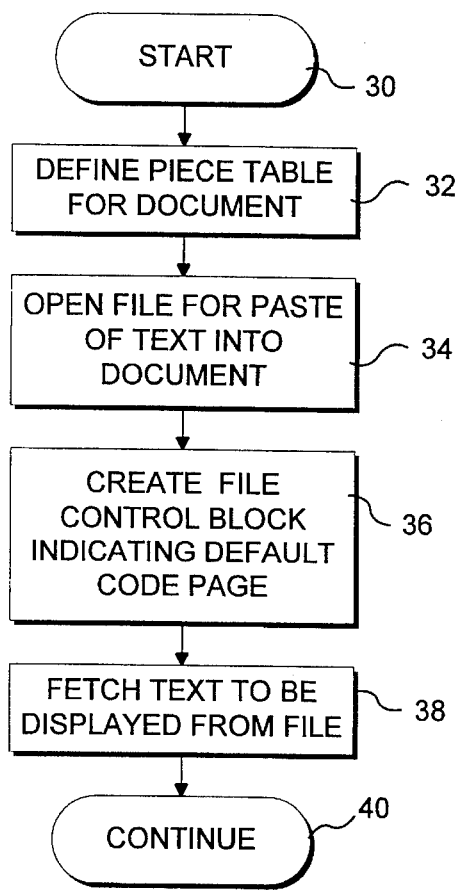
FIG. 3A is a general flow chart showing the steps implemented in handling text that uses different code pages.
Figure 3B:
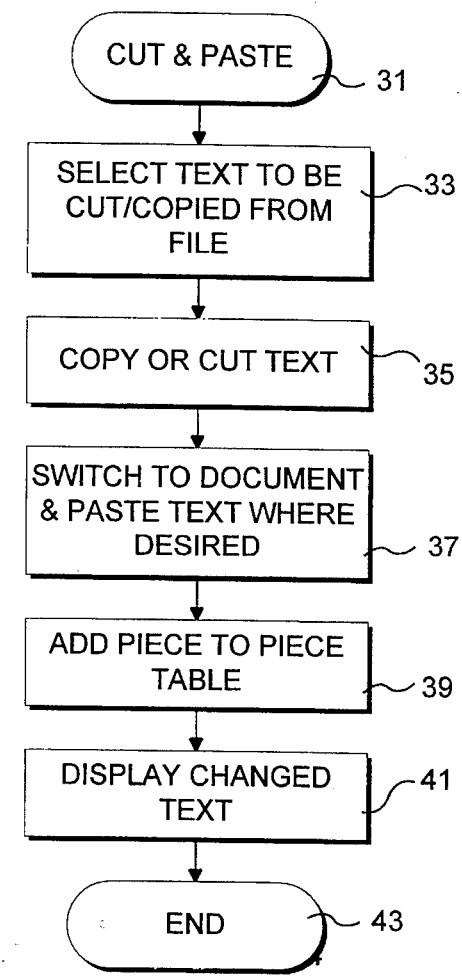
FIG. 3B is a flow chart illustrating the steps implemented in a cut (or copy) and paste edit between text in a file and a document.
Figure 3C:
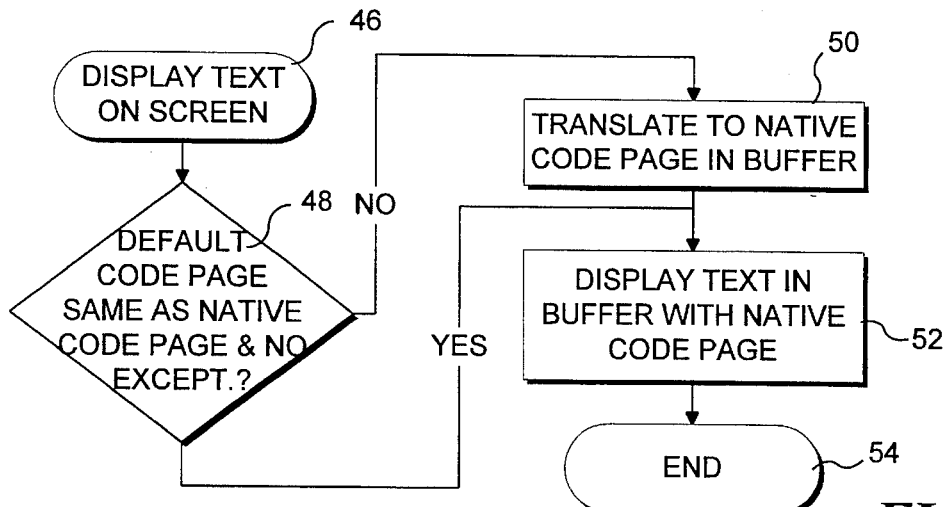
FIG. 3C is a flow chart showing the steps for displaying text stored within a document on a display screen of the computer, where the text may be encoded using a foreign code page.

The steps generally involved in the method of the present invention are set forth in flow charts shown in FIGS. 3A, 3B, and 3C, beginning with a start block 30 in FIG. 3A. In a block 32, a piece table for the native word processing system document is defined and modified as changes to the document are made. It should be recognized that there are four possible states for a piece table when a document is opened by the word processing system. In the first case, for any document that was previously fast saved to a file, a piece table will exist in that file. The piece table is needed in this case because the text comprising the document was likely not stored in a contiguous sequence in the file. By reference to the piece table, the word processing system will know how the pieces of text in the file knit together in a coherent document. The second case applies to a full save word processing document. For a document that was previously full saved, no piece table need be stored in the document file because the header information of the file is sufficient to describe the document, and all of the text in the document is in a natural contiguous order. The word processing system will create a piece table with a single piece when the full saved document is next opened and add to the table as editing changes are made to the document. The third case applies to a document that is a text file and not in the native format of the word processing system. In this case, a piece table is created when the file is opened that points to the first character of the file and ends at the last character. The fourth case applies when a new document is initially created. At that time, the word processing system produces an "empty" piece table consisting of a single piece and adds pieces to it as text is added to the new document and changes occur.

Figure 4:
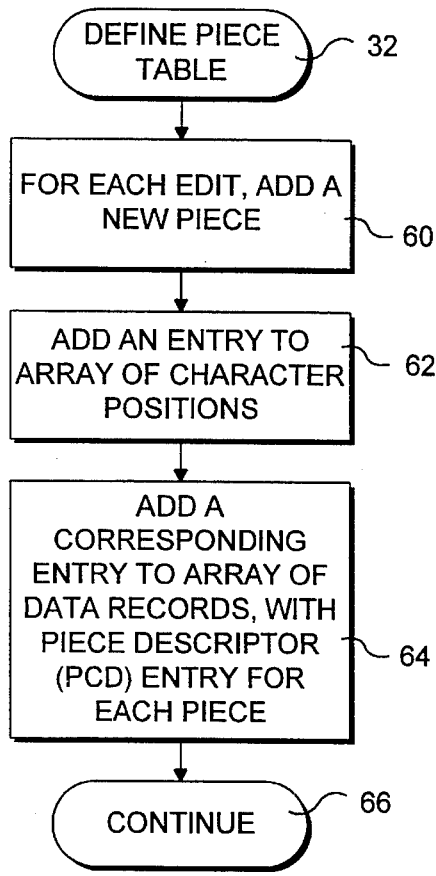
FIG. 4 is a flow chart showing details of the steps carried out in creating an initial piece table for a document and adding to it as the document is edited.

Details of the step for defining and adding pieces to a piece table are shown in FIG. 4. In a block 60, as each pieces of text is added to the document by editing, a new piece is added to the piece table. When a new piece is added, as noted in a block 62, an entry is added to the array of character positions that references the character coordinate in the document at which the piece begins. Addition of text to the document will cause the character coordinates of pieces that follow the addition to change. In a block 64, the word processing system also adds a corresponding entry to the array of data records, which is a PCD entry for the new piece. (As will be explained below, if the new piece was pasted from another file, the PCD entry will include the file number and the file coordinates of the new piece in that file.) If the user types in the new piece, the PCD will store the piece and reference its location in a temporary file that is maintained on the hard drive until the document is next saved to a file. The procedure continues at a block 66, returning to the logic in FIG. 3A.

File Control Block

Figure 5:
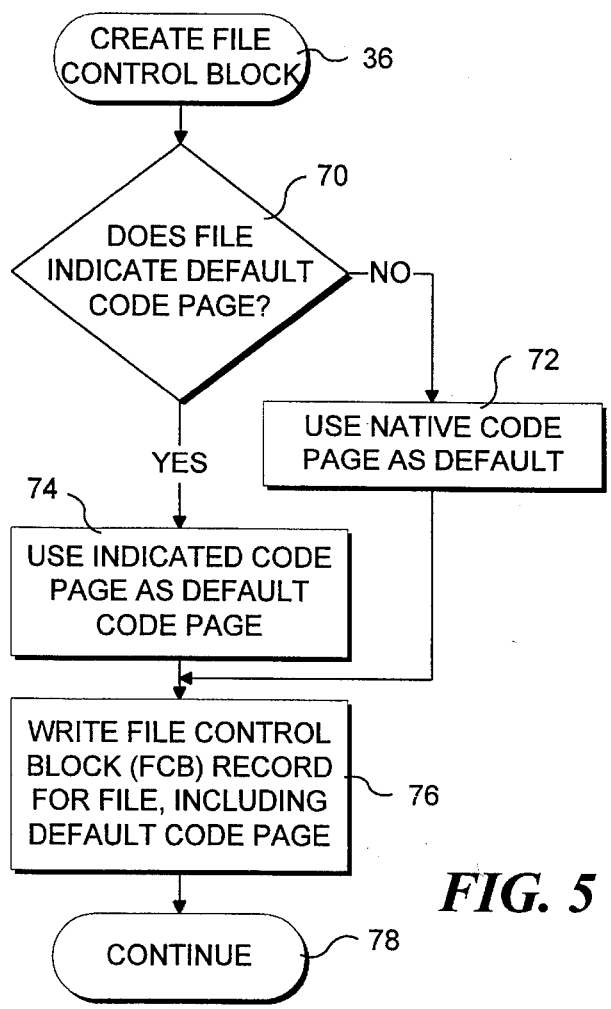
FIG. 5 is a flow chart showing the logical steps involved in creating a control block that stores a default code page for a file.

Referring again to FIG. 3A, when the user wants to paste text into the document from another file, a block 34 provides for opening that file so that text stored within it can be displayed, selected, cut or copied, and then pasted into the native word processing document. The text that the user wants to paste into the current document may have previously been created by the native word processing system under the operating system of personal computer system 10, and therefore, may use the native code page of the word processing system. However, the text of the file opened may also have been created under a different operating system that uses a foreign code page for encoding the text to be pasted. As a further alternative, the text that the user wants to select for pasting into the current word processing document may use the default native code page but may include words or phrases that employ a foreign code page. In a block 36, the word processing system creates an FCB, indicating the default code page for the file that is the source of the text to be pasted into the document. Details of this step are shown in FIG. 5.

As indicated above, a header for a file in which a word processing document is stored generally indicates the default code page chs that is used for text in the file. Accordingly, a decision block 70 in FIG. 5 checks to determine if the file that stores the text to be pasted into the document includes a header, which indicates the default code page that should be used for the text in the file. If the file that includes the text to be pasted into the current document is in an ASCII form, there will be no header, and therefore, no indication of the default code page. In this case, a negative response to decision block 70 leads to a block 72 that applies the native code page of the word processing system as the default selection for fcb.chs. Conversely, if a default code page for the imported text in the file is indicated, a block 74 provides for using the indicated code page as the default code page for all text pasted from that file into the current word processing document. Thereafter, a block 76 writes the FCB record for the file, including the two-byte short word fcb.chs that indicates the default code page for text to be pasted into the current word processing document from the file. A block 78 continues with the logic in FIG. 3A.

Each character that is recorded by the word processing system has a list of attributes associated with it that must be maintained by the word processor. These attributes can also be referred to as a property of the character. It is frequently the case that properties recorded for a particular character are the same as the properties recorded for several or even many characters preceding or following that character in a file. Adjacent characters having property settings that are identical are said to form a "run of text." For example, the sentence, "To emphasize a point, a bold font can be used." includes three runs of text. The first run of text is "To emphasize a point, a", the second run of text is "bold" and the third run of text is "font can be used." The word processing system keeps a table of file locations within each file that is opened, to mark the transition between one run of text and the following run of text in the file. It also maintains a pointer that is associated with each run of text transition and points to a data block that records current settings for the properties in each run of text that are different from a set of property settings assumed to be assigned to a run of text by default. Thus, if characters in a run of text are all to be displayed in bold face, and the word processing system assumes that all text recorded in a file by default should be displayed without bold face, the word processing system creates a record in the data block indicating that the default assumption should be overridden in the portion of the file in which the bold font run of text appears so that bold font will be used with characters in that run of text.

In accordance with the present method, it is assumed by default that text to be pasted into a document from a file will be interpreted using the character set or code page that is recorded for the file containing that text in the field fcb.chs entered within the FCB for the file. If the text is to be interpreted using a different code page than that recorded for the file, the word processing system adds an entry to the exception records for each run of text that must be interpreted using a different code page and specifies the different code page that should be used. The entry that is added to the exception record comprises a unique single-byte code that specifies the default code page declaration as being overridden, followed by a two-byte code page specifier that records the code page that should be used. Using this technique, as little as one character of text or as much as all of the text in a file can be tagged to specify that a code page different than the default code page is to be used to interpret the text.

Figure 6:
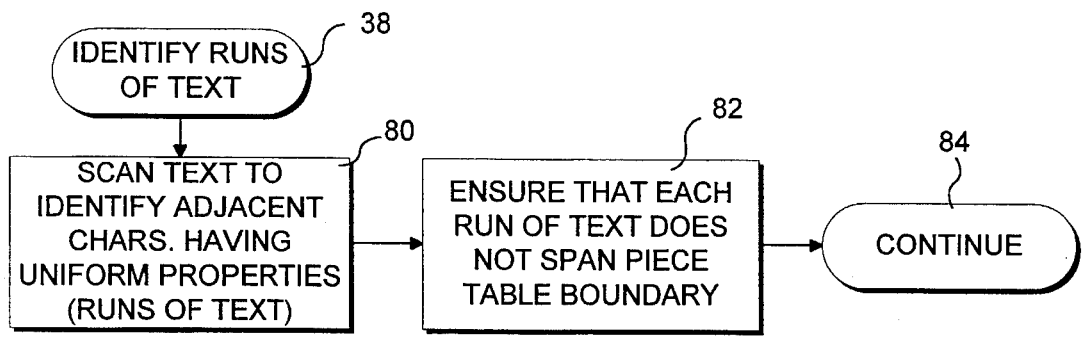
FIG. 6 is a flow chart showing the logic used in identifying runs of text.

The steps carried out to identify runs of text in a file are shown in FIG. 6. In a block 80, the word processing system scans the text in the file to identify any groups of adjacent characters that have uniform properties and therefore comprise a run of text. In a block 82, the word processing system further insures that each run of text does not span a piece table boundary. In a block 84, the procedure continues with the next step of the process.

When text using a foreign code page is pasted into a document, the word processing system does not scan the entire file to convert all foreign code page characters to the native code page. Instead, only the characters of text in the file that the user selects to be displayed are translated from the foreign code page into the native code page. This process is initiated in FIG. 3A at a block 38, which fetches the text to be displayed from the file. Details of the steps implemented in fetching text from a file are illustrated in FIGS. 7A and 7B.

Figures 7A, 7B:
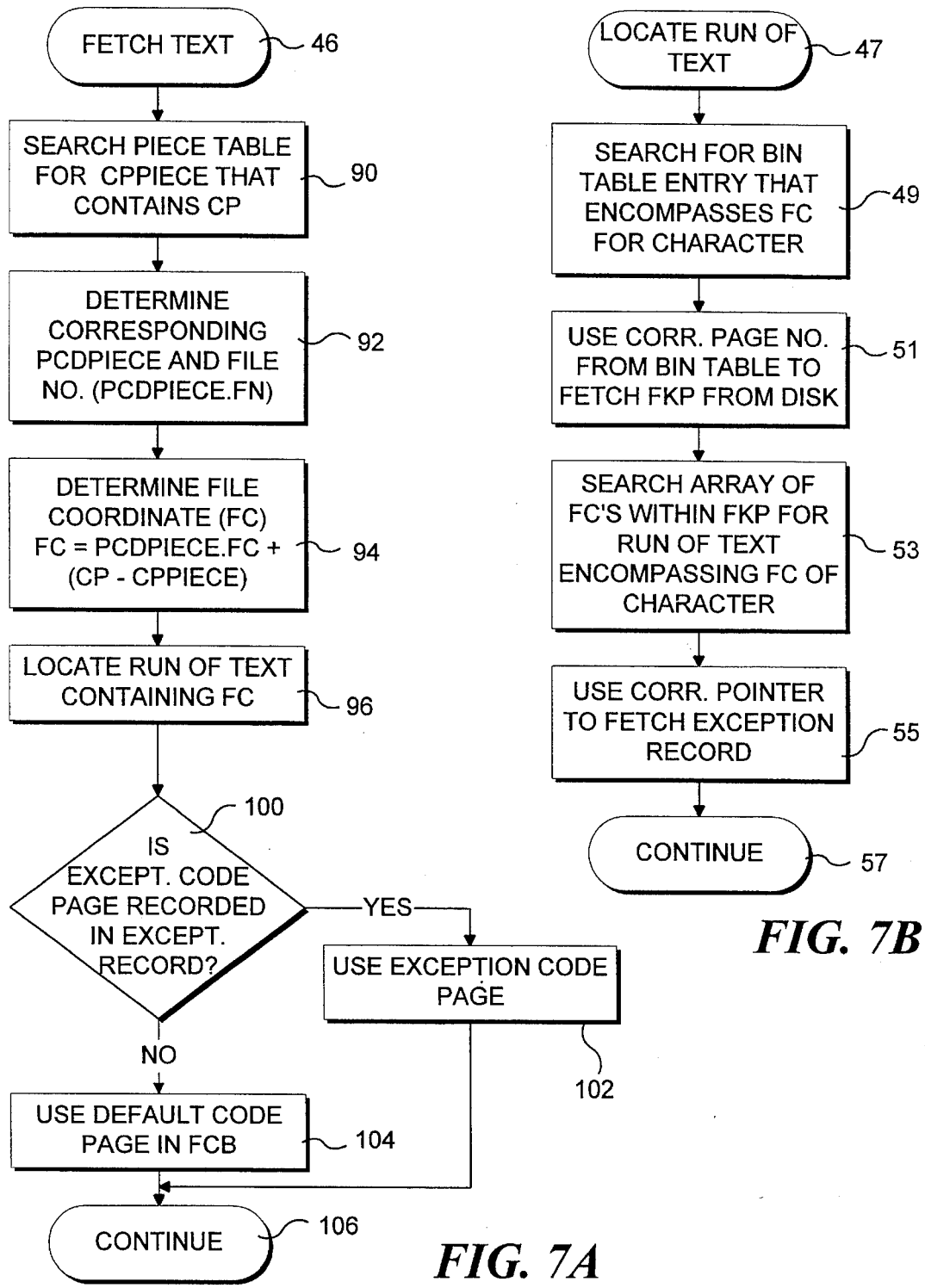
FIG. 7A is a flow chart showing the steps implemented in fetching text for display in a document.
FIG. 7B is a flow chart showing the steps followed in locating a specific run of text.

With reference first to FIG. 7A, the steps involved with determining the property exceptions for a particular character that is included among text fetched from a file are indicated. The steps in this flow chart are generalized to cover any occurrence of fetching text to be displayed, but are specifically employed at this point to fetching text to be displayed so that it can be selected and cut or copied for pasting in the current native word processing document. When fetching text for display, it is first necessary to determine the file number of the file that contains the first character of text to be displayed and then to determine the file coordinate within the file for that character. In connection with this step, a value cp represents the character position for which the word processing system determines the file number and file position. Further, the variable cpPiece contains the character position in the document (for the file that is opened to copy or cut the text to be pasted into the current document in this instance) for the beginning of the piece. The character position cpPiece is obtained by searching the piece table for the largest character position that is less than or equal to cp, as indicated in a block 90. A variable pcdPiece is the PCD entry in the array of data records that corresponds to the character position cpPiece. Consequently, the file coordinate, fc, of cp is determined from the following equation:

$$fc = pcdPiece.fc + (cp - cpPiece) \qquad (1)$$

The file number for the file that contains the desired character is referenced by the variable pcdPiece.fn. These last two steps are carried out in FIG. 7A, in blocks 92 and 94.

Once the file number and file coordinates for a character requested by the user to be fetched for display and/or editing have been determined, the word processing system next must locate the run of text that contains that file coordinate, fc, as indicated in a block 96. Details of this step are shown in the steps of FIG. 7B. To locate a run of text as indicated in a block 47 of FIG. 7B, the word processing program searches for the bin table entry that encompasses the fc for the character in question in accordance with a block 49. In a block 51, the program uses the corresponding page number that it obtains from the bin table to fetch the appropriate FKP from the file stored on the hard drive. As provided in a block 53, the program then searches the array of fc's within the FKP for the run of text that encompasses the fc of the character being fetched. In a block 55, the corresponding pointer for the run of text is used to fetch the exception record stored in the file, so that any exceptions applicable to the characters in the run of text, including an exception to the default code page that specifies the code page that should be applied to the character can be determined (in the next step of FIG. 7A). The process continues at a block 57.

Referring back to FIG. 7A, using the pointer to the exception record that was just found, a decision block 100 determines if an exception code page for the run of text is recorded in the data block for the file. If so, a block 102 indicates that the word processing system will use the exception code page indicated for the run of text instead of the default code page specified for the file. If no exception code page is recorded in the data block, a block 104 indicates that the default code page recorded in the fcb.chs of the FCB should instead be used for the run of text and the character(s) contained therein. In either event, the logic continues in a block 106.

Displaying Text

To select the text that is to be pasted into the current word processing document, the user must be able to view it on the display screen. The steps generally implemented to display text are shown in FIG. 3C, starting at a block 46. When displaying characters of text that use a foreign code page, i.e., a code page different than the native code page used by the word processing system, it is necessary to determine if the default code page for the text to be displayed is the same as the native code page and to determine if an exception record has been recorded for the run of text in which the characters are disposed. A decision block 48 in FIG. 3 carries out this inquiry. Having carried out the steps of fetching the text to be displayed discussed above in connection with block 38 in FIG. 3A, the word processing system knows whether the characters to be displayed are encoded with a default code page (for the file in which they are stored) that is the same as the native code page and whether the character(s) are encoded with an exception code page that is different than the default code page of the file in which the characters are stored. If the response is negative, any foreign code page (whether indicated as a default or as an exception) must be translated to the native code page as the run of text using the foreign code page is loaded into a display buffer; this step is indicated in a block 50. Alternatively, if the default code page is the same for the run of text to be displayed as the native code page and no exception block is recorded, the text can be directly loaded into the display buffer without any translation between code pages.

The steps required for translating a foreign code page to the native code page as the text is loaded into the display buffer are indicated in FIG. 8. In a block 110, the word processing system opens a new display buffer and loads it with text to be displayed. Text that must be translated from a foreign code page to the native code page is replaced with the closest matching character from the native code page (assuming that one exists) in a block 112. In a block 114, the closest matching character in the native code page is written to the new display buffer. During this process, the foreign code page for the text to be pasted into the current document is maintained without any change, since it is only necessary to translate the foreign code page characters into the native code page in the display buffer, for purposes of displaying intelligible characters to the user that can be read and edited. The method continues with a block 116, returning again to FIG. 3C. In a block 52 in FIG. 3C, the text that was loaded into the display buffer either directly, because no translation was necessary, or following the translation that occurred in block 50, is presented to the user on display 18. A block 54 ends the display text routine.

Cutting and Pasting Text

Once the text in the file that was opened is displayed, the user can select the portion of the text that is to be pasted into the current word processing document. The steps involved in this operation are shown in FIG. 3B, starting at a block 31. In a block 33, the user is enabled to select text to be cut or copied from the that of the open file that is displayed. Conventional commands for moving the selection through the displayed text and for cutting or copying the selected text are employed in accordance with a block 35. The user is then enabled to switch the focus of the word processing system to the current document into which the text that was cut or copied is to be pasted, and to define the insertion point at which the paste operation is carried out, as noted in a block 37. In a block 39, the word processing program adds a piece to the piece table for the current document that corresponds to the text that was just pasted into that document. As disclosed above, the PCD for this piece identifies the file from which the piece was obtained and the file position within that file. Of course, as the piece is pasted into the current document, it is displayed therein, representing a changed appearance to the display of the document, as noted in a block 41. The steps described above in connection with FIG. 3C are employed to enable the pasted text to be properly displayed. The cut and paste operation terminates at a block 43.

Saving the Document

When a document is finally saved to a file after text that uses a foreign code page has been pasted into the document, the word processing system continues to maintain a record of the appropriate code page that should be applied to each character of the text. Details of the steps involved in saving a document so as to maintain the references to proper code pages used with the text are shown in FIG. 9. This process starts at a block 120 when the word processing system initiates a "save document step." In a block 122, the word processing system fetches a run of text from the document that is being saved. The steps involved for fetching text that were discussed above in connection with FIGS. 7A and 7B are again implemented at this time. Since each run of text may use either the native code page or a foreign code page, the word processing system must evaluate the code page that is applicable to each such run of text that is fetched for the save operation.

In a decision block 124, the word processing system determines if the run of text that was just fetched uses an exception code page. If not, a decision block 126 determines if a default code page was used for the run of text in the file in which it was stored, and whether the default code page (of the old file from which the text was obtained) is different than the default code page for text being stored in the new file to which the document is being saved. If not, the word processing system applies the default code page of the new file to the run of text being saved in a block 128, since the code page for the text and the native code page (the default) are identical. A block 130 then writes the run of text to the new file.

If the run of text uses an exception code page, a decision block 138 determines of the exception code page is different than the default code page for the new file in which the document is being saved. If not, the logic proceeds to block 128. Otherwise, as noted in a block 140, the word processing system adds an appropriate exception code page for the run of text to the data block for the new file in which the document is being saved.

A decision block 132 determines if there are any more runs of text to be processed in saving the document, and if not, terminates the save process in a block 134. However, if additional runs of text yet remain to be saved, the logic returns to block 122 to fetch the next run of text. In this manner, all runs of text in the document are processed and saved to file with the appropriate data indicating either the default code page or the exception code page that should be applied. Since the saved document includes references to the code page used for each run of text in the file, the word processing system on which the text pasted into the current document was originally created can open the saved document file for further editing or simply just to display the document, without loss of any characters originally created, for which no corresponding translated character was available in the word processing system into which the text was first pasted or simply displayed. The word processing system and the method that it incorporates for handling foreign code pages is thus both efficient and accurate in preserving code page information about each character in the documents that it saves.

Although the present invention has been described in connection with its preferred form, those of ordinary skill in the art will understand that many modifications can be made thereto within the scope of the claims that follow. Accordingly, it is not intended that the scope of the invention in any way be limited by the above description, but that it be determined entirely by reference to the claims that follow.

The invention in which an exclusive right is claimed is defined by the following:

1. A method for handling text that uses a code page different than a native code page, comprising the steps of:

(a) producing a piece table that includes an array of character positions, and an array of data records, said array of character positions being divided into a plurality of pieces, each data record corresponding to a piece of the array of character positions, each piece referencing adjacent characters of the text that have common format properties;

(b) based upon data in the array of data records, identifying files in which the text referenced by the plurality of pieces is stored;

(c) writing data blocks to each file, said data blocks recording a default code page for the text stored in each file;

(d) if any text stored in a file uses a code page different than the default code page recorded for said file, writing exception data to the data block that identify an exception code page for said text; and (e) if the code page for any text to be displayed differs from the native code page, displaying said text by translating between the code page used by the text and the native code page, the code page for the text to be displayed remaining unchanged in the file in which said text is stored, so that any characters in the text that do not use the native code page are retained in said file.

2. The method of claim 1, further comprising the steps of providing a file control block for each file containing text that is opened to access the text stored within said file; and within said file control block, including an indication of a default code page for the text stored within said file.

3. The method of claim 2, further comprising the step of determining the code page for any character in the text comprising a document by identifying the piece that references the character, and based upon the record in the array of data records that corresponds to said piece, determining a file number and a file position for said character, the indication of the default code page being determined by referring to the file control block of said file.

4. The method of claim 3, further comprising the step of providing a data block in said file, said data block including an exception code page for any run of text stored within said file that does not use the default code page.

5. The method of claim 4, wherein character position array coordinates that reference each run of text are fully contained within one piece of the array of character positions.

6. The method of claim 4, further comprising the step of determining whether an exception code page should be recorded in the file to which the document is saved, the exception code page being recorded for a specific run of text if said specific run of text uses a code page that differs from the default code page for the file in which the document is saved.

7. The method of claim 1, wherein the step of translating includes the step of mapping characters in the text using a code page that is different than the native code page to a display buffer, said step of mapping comprising the step of applying a best possible match of characters using the native code page, to the characters using the code page that is different.

8. A method for handling text using a code page that is different than a native code page used in a document into which the text is pasted, comprising the steps of:

(a) producing a piece table by scanning characters comprising the document to develop an array of character positions and an array of data records, said characters in the document being referenced in the array of character positions by a sequence of character position coordinates, said array of character positions being divided into a plurality of pieces, each piece comprising characters of text that are disposed adjacent to each other in the document and which have common properties;

(b) including in each record of the array of data records:
  (i) a file number for a corresponding piece of the array of character positions, said file number indicating a file in which the characters referenced in the piece are stored; and
  (ii) a file position in said file where said characters are to be found;

(c) producing a file control block for any file that is opened to paste text into the document, said file control block including code page identifier data indicating a default code page for the text stored in said file, and thus, for the text referenced by any of the pieces;

(d) providing a data block for each file that is opened to paste text into the document, said data block including a specifier for an exception code page to be used for any run of text in the file that has a different code page than the default code page for the file in which the run of text is stored, so that the default code page for the file in which the run of text is stored and the data block for the run of text are checked to determine the code page to be applied to all of the characters in said run of text; and (e) when the code page used by any run of text to be displayed is different than the native code page, translating the code page for the characters in the run of text to be displayed to the native code page using a closest available mapping, said code page for the run of text being retained if the document is saved to a file, thereby ensuring that a reference to the code page for any text pasted into the document is not omitted from the file to which the document is saved.

9. The method of claim 8, further comprising the steps of determining if a run of text being saved to a file and previously identified as using an exception code page uses a code page that is the same as the default code page for said file to which the run of text is being saved; and if not, omitting the specifier for said run of text from the data block of said file so that an exception code page for the run of text is not indicated.

10. The method of claim 8, further comprising the steps of determining if a run of text being saved to a file and previously identified as using a default code page has a code page that is different than the default code page for said file to which the run of text is being saved, and if so, inserting a specifier for an exception code page in the data block of said file indicating the code page used for said run of text.

11. The method of claim 8, wherein the code page identifier data in the file control block of each file that is opened to paste text into the document comprises a plurality of bytes.

12. The method of claim 8, wherein the data block includes:

(a) a byte indicating the default code page used for text in the file does not apply to a specific run of text; and (b) a plurality of bytes indicating the exception code page used for said specific run of text.

13. The method of claim 8, further comprising the step of determining the code page for a character in the document by:

(a) searching the piece table for a target piece having a maximum beginning character position coordinate that is less than or equal to the character position coordinate of said character;

(b) within said target piece, determining a file coordinate for the maximum beginning character position in a target file containing the text, by reference to a corresponding target record in the array of data records;

(c) determining the file coordinate of said character in said target file as a function of the file coordinate for the maximum beginning character and the character position of the maximum beginning character of the target piece;

(d) determining the file number of the target piece from the corresponding record in the array of data records;

(e) by reference to the file control block, determining a maximum beginning file coordinate for a target run of text, where the maximum beginning file coordinate is less than or equal to the file coordinate for said character in the target file; and (f) identifying the default code page and any specifier for an exception code page for the run of text, by reference to the file control block and the data block for the target file.

14. The method of claim 13, wherein each run of text is fully contained within one piece and fully contained within one file.

15. The method of claim 8, wherein the step of translating comprises the step of loading a display buffer with characters mapped from the native code page to replace corresponding characters that use a different code page, so that the display buffer can be used to display the text pasted into the document.

16. A method employed in a word processing system for handling text pasted into a document, the pasted text using a foreign code page, which is different than a native code page of the word processing system, comprising the steps of:

(a) as the document is created, producing an array of character positions that reference each character of the document with a position coordinate, said array of character positions comprising a plurality of pieces, each piece including a sequence of characters adjacent to each other in the document, which all have a common format;

(b) producing an array of data records, each record corresponding to one of the pieces comprising the array of character positions and including a pointer to a file in which the characters referenced by the position coordinates of said piece are stored;

(c) for each file that stores text used in the document, recording data indicating the code page used for the text stored in the file; and (d) when any character of the document is displayed, determining the code page used by said character by reference to the array of character positions, the array of data records, and the file control block for the file in which the character is stored, and if the character uses a foreign code page, translating between the code page used by the character and the native code page to display a best available mapping of the character, any references to the foreign code page for characters of the text in the document being retained when the document is saved to a file so that characters that cannot be accurately mapped from the foreign code page to the native code page are not lost.

17. The method of claim 16, wherein the step of recording data indicating the code page includes the step of indicating a default code page for the text stored within each file.

18. The method of claim 17, wherein the step of recording data indicating the code page includes the step of recording an exception specifier indicating the code page for any text stored within the file that does not use the default code page.

19. The method of claim 18, further comprising the step of producing a table in each file storing text used in the document, said file indicating a start position in the file for a run of text, each run of text using a common code page.

20. The method of claim 19, wherein each separate run of text in the document is referenced by position coordinates within the array of position coordinates that are contained within a single piece, and wherein any separate run of text in the document is completely stored within one file.

21. A word processing system for handling text pasted into a document, the pasted text using a foreign code page that is different than a native code page of the word processing system, comprising:

(a) a computer that executes predefined instructions for processing text, said computer including a memory in which the predefined instructions are loaded, a display screen, and a user interface that enables a user to enter text to produce a document;

(b) a non-volatile memory in which data developed on the computer using the word processing system are stored in files;

(c) means for producing in the memory of the computer an array of character positions that reference each character of the document with a position coordinate, said array of character positions comprising a plurality of pieces, each piece including a sequence of characters disposed adjacent to each other in the document and having a common format;

(d) means for producing an array of data records, each data record corresponding to one of the pieces comprising the array of character positions and including a pointer to a file in which the characters referenced by the position coordinates of said piece are stored in the non-volatile memory;

(e) for each file in which text used in the document is stored, means for recording data indicating the code page used for the text stored in the file; and (f) means for determining the code page used by any character of the document that is displayed by reference to the array of character positions, the array of data records, and the file control block for the file in which the character is stored, and if the character uses a foreign code page, means for translating between the foreign code page used by the character and the native code page to display a best available mapping of the character, any references to the foreign code page for characters of the text in the document being retained when the document is saved to a file so that characters that cannot be accurately mapped from the foreign code page to the native code page are not lost.

22. The word processing system of claim 21, wherein the means for recording data indicating the code page include means for indicating a default code page for the text stored within each file.

23. The word processing system of claim 21, wherein the means for recording data indicating the code page include means for recording an exception specifier indicating the code page for any text stored within the file that does not use the default code page.

24. The word processing system of claim 21, further comprising means for producing a table in each file storing text used in the document, said file indicating a start position in the file for a run of text, each run of text using a common code page.

25. The word processing system of claim 24, wherein each separate run of text in the document is referenced by position coordinates within the array of position coordinates that are contained within a single piece, and wherein any separate run of text in the document is completely stored within one file in the non-volatile memory.

26. A method for exchanging documents between word processing systems that use different code pages for encoding text, without any loss or change of characters in the documents as a result of differences in said code pages, comprising the steps of:

(a) enabling a user to open a file on a first word processing system that uses a first code page to encode text, said document having been created by a second word processing system and containing text encoded by a second code page that is not native to the first word processing system;

(b) displaying at least a portion of the text from the document on the first word processing system, by translating between the second code page and the first code page to display characters from the first code page using a best possible match to characters of the second code page contained within said text that is displayed; and (c) enabling the user to save the document to a second file with the first word processing system and to retain the second code page encoding of the text in the document saved in the second file, so that all characters encoded with the second code page that are stored in the second file are displayed when the second file is opened for display on the second word processing system.

27. A method usable in a word processing system for handling text stored in a first file that is encoded using a foreign code page, which is different than a native code page, so that any character in the text for which there is no native code page encoded equivalent character is not lost or changed when said first file is opened by the word processing system for display in a document and then said document is saved to a second file, comprising the steps of:

(a) opening said first file containing the text encoded in the foreign code page for entry of at least a portion of the text into the document;

(b) determining if a default code page of the text selected to be displayed is identical to the native code page;

(c) identifying any exceptions records for characters in the text selected for display;

(d) where native code page encoded characters exist that correspond to characters of the text encoded with the foreign code page, translating said characters encoded with the foreign code page to corresponding native code page encoded characters and temporarily storing the native code page characters in a display buffer, and if no corresponding native code page characters exist, temporarily storing native code page characters that comprise a best possible match in the display buffer;

(e) displaying the native code page characters temporarily stored in the display buffer on a display screen; and (f) storing the document in said second file so that the text in the document that was encoded using the foreign code page is still encoded using the foreign code page and so that in said second file, no characters encoded in the foreign code page are changed or lost as a result of being stored in the second file, when the document is thus saved.

28. The method of claim 27, further comprising the steps of:

(a) producing a piece table to represent the document as it is edited by insertion of the text from said first file, said piece table including an array of character positions, and an array of data records, said array of character positions being divided into a plurality of pieces, each piece referencing a plurality of characters recorded contiguously in said first file, each data record in the array of data records corresponding to an entry in the array of character positions;

(b) based upon data in the array of data records, identifying the first file in which the text that was inserted into the document and referenced by the plurality of pieces is stored and determining positions of characters within said first file;

(c) writing data blocks to said first file, said data blocks recording a default code page for the text stored in said first file; and (d) if any text stored in said first file uses a code page different than the default code page recorded for said file, writing exception data to the data block that identify an exception code page for said text.

29. The method of claim 27, wherein only characters of the text from the first file encoded using the foreign code page that are displayed are translated to the native code page.

* * * * *